United States Patent [19]

Wolsey

[11] Patent Number: 4,637,147
[45] Date of Patent: Jan. 20, 1987

[54] STRETCHER BARS

[76] Inventor: Clarence K. Wolsey, 441 Fairview, #3, Arcadia, Calif. 91006

[21] Appl. No.: 729,129

[22] Filed: Apr. 30, 1985

[51] Int. Cl.⁴ .............................................. D06C 3/08
[52] U.S. Cl. ..................................... 38/102.1; 40/152; 160/381; 144/347; 403/382; 403/402
[58] Field of Search ....................... 403/401, 402, 382; 38/102.1; 160/381; 40/152, 156; 144/347, 85; 269/41

[56]  References Cited
U.S. PATENT DOCUMENTS 306,117 10/1884 Thayer et al. ....................... 403/382
2,083,354 6/1937 Whittier ........................... 403/401 X
2,155,729 4/1939 Mainieri ............................... 403/382

Primary Examiner—Werner H. Schroeder
Assistant Examiner—Andrew M. Falik
Attorney, Agent, or Firm—Boniard I. Brown

[57] ABSTRACT

Stretcher bars are provided, each having face and rear mitered sections and a tongue therebetween, the tongue cooperating with a mitered section to define a slot. At least one tongue section of each stretcher bar defines a bevel on a portion thereof remote from the side defining the slot to facilitate ready entry of the tongue sections into slots of mating stretcher bars in non-interfering relationship with the tongue and miter sections of mating bars.

2 Claims, 4 Drawing Figures

STRETCHER BARS

BACKGROUND OF THE INVENTION

A substantial market has long existed for preassembled stretch frames for artwork and the like, for professional and amateur use. Stretch frames are rectangular in configuration and are formed of stretcher bars having generally standardized end structures for the meshing together of end portions in miter joints, these end portions including mitered outer sections, a tongue section and a tongue-receiving slot.

Prior art manufacturing and fabrication techniques for assembling stretcher bars into stretch frames, have been relatively inefficient and/or have required the utilization of expensive equipment or machinery. Such prior art assembly methods and techniques have been characterized by inefficient, relatively slow manual preassembly steps or operations, which substantially increase the cost in time and labor and limit output.

The assembly of conventional stretcher bars can required expensive apparatus for assembly, including such equipment as electronic sensors, electronic components, automatically operated stapling guns, etc.

In the interengaging of the end portions of mating stretcher bars, the extending tongues interfere with the tongue sections and mitered sections of mating bar end portions which define the slots of the mating bar end portions. Manual manipulation and trial-and-error are usually necessary to accomplish entry of tongue portions into slots of mating bars, and this is the first stage of assembly which must be accomplished. Once such entry is started, the end portions of mating bars can readily be urged together to define miter joints without difficulty, either manually or mechanically utilizing actuation means and appropriate fixtures. Unless initial entry of the tongue sections into the mating slots is effected, urging of the stretcher bar end portions together, as by mechanical means, results in damaging and crushing the bar end portions, so that many stretcher bars are scrapped.

It is therefore an object of the invention to provide stretcher bars having end portions with tongues adapted for rapid and proper entry into slots of mating stretcher bar end portions.

An object of the invention is to eliminate manual manipulation and trial-and-error in entry of stretcher bar tongue portions into slots of mating stretcher bars in the assembly of stretcher bars into stretch frames.

An object of the invention is to reduce the time, labor and costs of assembling stretcher bars into stretch frames.

An object of the invention is to provide apparatus for automatic assembly of stretcher bars into stretch frames with effective and rapid entry of stretcher bar tongue portions into slots of mating stretcher bars.

An object of the invention is to provide apparatus whereby entry of stretcher bar tongue portions into slots of mating bars is quickly and automatically effected.

An object of the invention is the provision of apparatus which eliminates the time and labor involved in manual preassembly of stretcher bar end portions in the assembly of stretch frames.

It is an object of the invention to enable the utilization of apparatus for assembling stretcher bars into stretch frames which is much less expensive than equipment otherwise required.

SUMMARY OF THE INVENTION

The aforementioned objects and advantages, as well as other advantages which will be apparent from the description of the preferred embodiment, are provided and achieved by stretcher bars and apparatus according to the invention. Stretcher bars according to the invention, for assembly in rectangular stretch frames for artwork, each have first and second end portions, a face surface and a rear surface. Each of the bars has a face mitered section, a rear mitered section and a tongue therebetween, these mitered sections of respective bars being adapted for abutting engagement in miter joints. The first end portion tongue section is adjacent to the face mitered section, and the second tongue end portion is adjacent to the rear mitered section. Each tongue section cooperates with a mitered section to define a slot to receive the tongue of a mating stretcher bar. At least one tongue section of each stretcher bar end portion defines a bevel on a corner portion which is remote from the tongue side which defines the slot, whereby there is facilitated ready and convenient entry of the tongue sections into the slots of mating, adjoining stretcher bars, with a non-interfering relationship between the tongue sections and the tongue and mitered sections of mating bar end portions. The tongue sections of each end portion of each stretcher bar may preferably be beveled, although effective results are provided with only the tongue section on one end portion of a bar being beveled.

An apparatus according to the invention for assembling stretcher bars into stretch frames may preferably comprise a rectangular frame about a planar assembly surface on which stretcher bars are positioned prior to assembly. The frame has first and second members which define a corner and are preferably provided with flanges to retain stretcher bars on the surface. An arm extending generally diagonally of the frame has one end portion pivotally mounted to the frame at the corner and may have its other end portion adjustably positioned and mounted on a third frame member. Actuators are mounted on the frame for actuation of their respective arms in directions parallel to the first and second frame members, respectively, and a third actuator is mounted, preferably on the diagonal arm for operation of its actuating arm, preferably in a direction generally parallel to the arm. With stretcher bars according to the invention positioned on the assembly surface, the actuators are operated in their respective operational directions to urge together the plurality of stretcher bars to engage their end portions in interfitting relation, the tongue sections of the bar end portions engaging in the end portion slots of mating bars, and the mitered sections of the bars abutting to form miter joints. The beveled portions of the tongue sections of the bar end portions greatly facilitate initial entry and engagement of the tongues in the slots in non-interfering relationship with the adjacent tongue and mitered sections of the mating bar end portions.

DESCRIPTION OF THE PREFERRED EMBODIMENT

Figure 1:
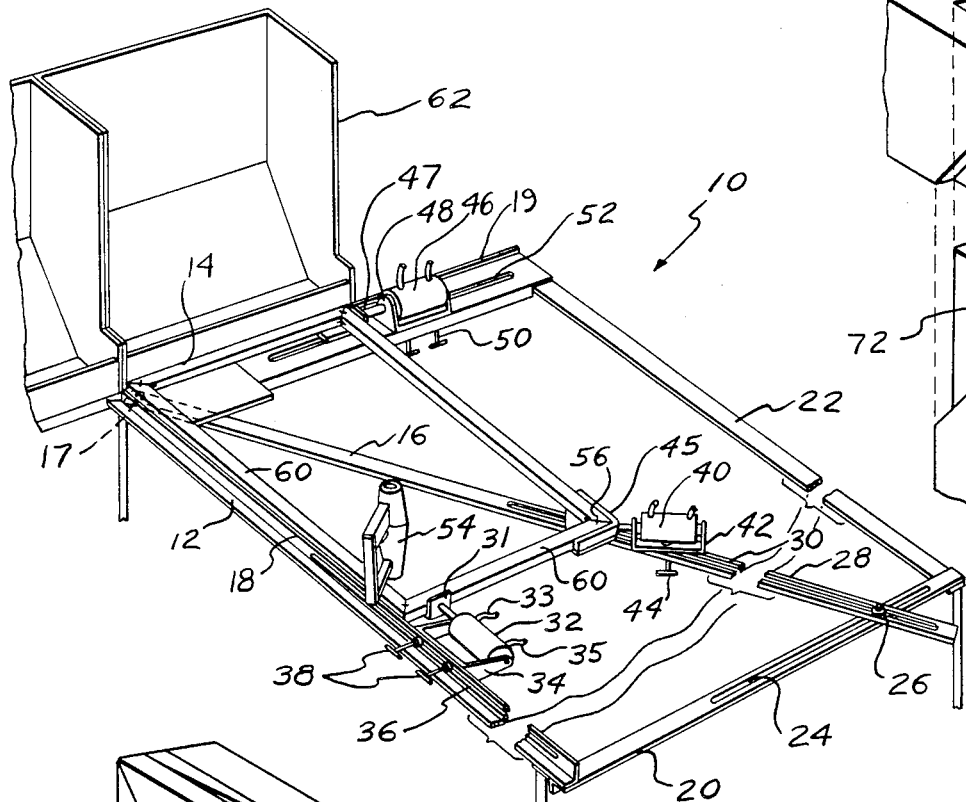
FIG. 1 is a perspective view of an apparatus for assembling stretch frames utilizing stretcher bars according to the invention.
Figure 3:
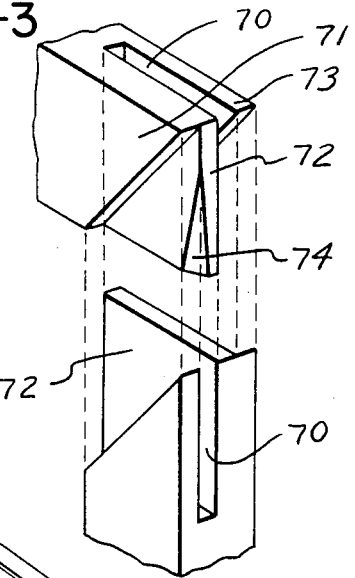
FIG. 3 is a fragmentary perspective view of portions of mating end portions of stretch bars according to the invention, showing a form of the invention wherein only one of the mating tongue portions is beveled.
Figure 2:
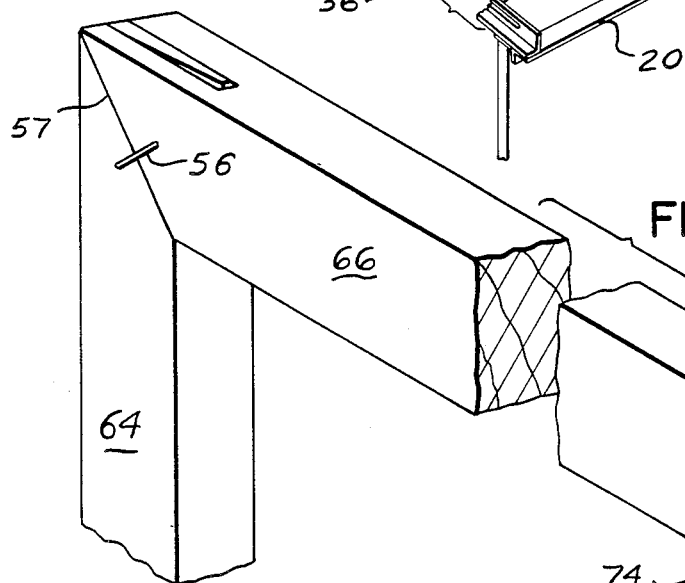
FIG. 2 is a perspective view of portions of a stretch frame and stretcher bars, showing stretch bar end portions according to the invention and the manner of their interengagement.

Referring to the drawing, FIGS. 2 and 3 illustrate preferred embodiments of stretcher bars according to the invention, and FIG. 1 illustrates one preferred apparatus for assembling the stretcher bars into stretch frames by interengaging the bar end portions.

In the preferred embodiment of FIG. 2 each bar has first and second end portions, a face surface (60, 64, 66) and a rear surface. Each end portion of each stretch bar has a mitered face section 71, a mitered rear section 73, a tongue section 72, and a slot 70 defined between the tongue and one of the mitered sections. The first end portion, such as the right end portion of the upper bar in FIG. 2, has the slot defined between the rear mitered section and the tongue section, while the other end portion, like that shown in the lower right portion of FIG. 2, has the slot defined between the face mitered section and the tongue section. The mitered sections have end miter surfaces inclined at 45° to the axis and outer edge surface of the bar, as shown.

As indicated by the broken lines interconnecting portions of respective components of mating bars in FIG. 2, the mitered sections of mating stretcher bars are adapted for abutting engagement to form miter joints, as indicated at 57 in FIG. 2.

In the embodiment shown in FIG. 2, a bevel surface or portion 74 is defined on the corner portion of each tongue section, this bevel being defined on the corner portion remote from the side of the tongue which cooperates with a miter section to define the slot 70 in each bar.

The bevel surface or portion 74 on the tongue section of a bar end portion greatly facilitates ready entry of the tongue section into the slot of a mating stretcher bar without interference and in non-interfering relationship with the mitered section which defines the slot, or with the tongue section which cooperates to define the slot.

FIG. 3 illustrates another preferred or modified embodiment of stretcher bar according to the invention, wherein the bevel or beveled surface 74 is provided on only one of the tongue portions of adjoining or mating stretcher bar end portions. Interengagement of adjoining end portions of mating bars is greatly facilitated with only one of the tongue portions being thus beveled, and ready interengagement of the mating bar end portions is substantially facilitated, without interference between the tongue and miter sections of a mating bar end portion.

Figure 4:
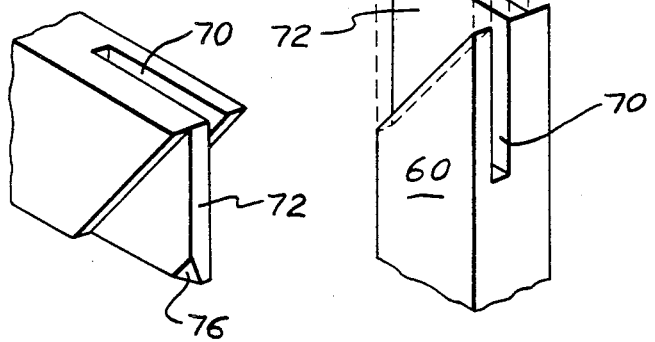
FIG. 4 is a perspective view of end portions of mating stretcher bars according to the invention, showing a modified, less elongated beveled tongue portion.

FIG. 4 shows a modified form of the invention wherein a less elongated beveled surface or portion 76 is utilized.

Manual assembly of stretcher bars into frames is much faster and more convenient utilizing stretcher bars having the beveled tongue portions according to the invention. Tedious assembly and trial-and-error are substantially eliminated. Utilizing stretcher bars having the beveled tongue portions according to the invention, assembly of quantities of stretch frames by means of mechanical or automatic equipment, is substantially facilitated, and considerable time and labor are saved. Difficulties of manual trial-and-error fumbling and jostling of stretcher bars in interfitting tongues and slots of end portions of mating stretcher bars are essentially eliminated. Twenty-five per cent or more of such time and labor can be saved with equipment which is not substantially automatic, and fifty per cent and more of labor and time can be saved with automatic equipment.

FIG. 1 illustrates one preferred form of apparatus for assembly of stretcher bars according to the invention into stretch frames. The apparatus includes a generally rectangular frame formed by a first frame member 12, a second frame member 14, a third frame member 20, and a fourth frame member 22. The frame encompasses a table or plate to provide a planar surface for the positioning of a plurality of stretcher bars prior to assembly into a stretcher frame. The first and second frame members 12, 14 have upwardly extending flanges 18, 19 to retain stretcher bars. A diagonal member 16 is pivotally mounted at the corner 17 defined by frame members 12 and 14, and the opposite end of diagonal member 16 is adjustably positioned and mounted for engagement of a securing bolt 26 in a slot 28 defined in member 16 and a slot 24 in member 20. The adjustment feature provides for combination of various sizes of stretcher bars to assemble stretcher frames of different sizes.

Fluid actuators, preferably hydraulic actuators, are provided to urge stretcher bars into engagement, and include an actuator 32 mounted on frame member 12 by means of bracket 34 secured in a slot 36 by fasteners 38, and actuator 46 mounted in a slot 52 of a mounting plate by means of a bracket 48 and fasteners 50, and an actuator 40 adjustably mounted on the diagonal member or arm 16 by means of a bracket 42 secured by a fastener 44 in slot 30 of the member. Actuator 32 preferably operates its actuator arm in a direction parallel to member 12 and has an end plate 31 adapted to engage the stretcher bars. Actuator 46 operates its actuating arm in a direction parallel to member 14, plate 47 on the end of the arm being adapted to engage stretcher bars. Actuator 40 is adjustably positioned to orient its operating arm in a wide range of orientations, but preferably the arm may operate in the direction generally parallel with member 16. A right-angle engaging member 45 is provided at the end of the arm to engage two stretcher bars in forming a corner of a stretch frame. The actuators are operated via fluid lines, such as lines 33, 35 connected to actuator 32.

Stretcher bars are deposited on the planar surface within the frame, as by a hopper 62, and are roughly positioned prior to assembly. The actuators are operated by controls or by automated equipment to urge the bar end portions to interengage. The beveled tongue surfaces 74 greatly facilitate ready entry of tongue portions of bar end portions into the slots in the end portions of mating stretcher bars, under the urging of the actuators, without interference of entering tongue portions with the mitered sections and tongue sections of mating bar end portions, in an automatic manner.

After interengagement of the end portions of bars to form a stretch frame, the bar end portions being joined in miter joints as indicated at 57 in FIG. 2, and the adjoining end portions of the bars are secured by appropriate fasteners, such as staple 56 (FIG. 2).

Thus there has been shown and described a novel structure and apparatus which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. For assembly in a generally rectangular stretch frame for artwork and the like, a plurality of elongated stretcher bars each having first and second end portions, a face surface and a rear surface,
   each of said stretcher bars having at each of its said first and second end portions a face mitered section, a rear mitered section and a tongue therebetween, the mitered sections being adapted for abutting engagement to form miter joints, the first end portion tongue being adjacent to the face mitered section and the second end portion tongue being adjacent to the rear mitered section, each tongue section cooperating with one of the mitered sections to define a slot adapted to receive a tongue of another stretcher bar, and
   at least one of the tongue sections of each stretcher bar defining a bevel on a corner portion thereof remote from the side defining said slot, thus to facilitate ready entry of the stretcher bar tongue sections into slots of mating adjoining bar tongue sections into slots of mating adjoining bars in non-interfering relationship with the tongue and mitered sections of mating bar end portions.

2. An apparatus according to claim 1, wherein:
   the tongue sections of each end portion of each stretcher bar are beveled.

* * * * *